United States Patent
Landers, Jr. et al.

(10) Patent No.: US 8,543,948 B2
(45) Date of Patent: Sep. 24, 2013

(54) STRUCTURE FOR PCI-E BASED POS TERMINAL

(75) Inventors: John D. Landers, Jr., Raleigh, NC (US); David J. Steiner, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1290 days.

(21) Appl. No.: 12/112,541

(22) Filed: Apr. 30, 2008

(65) Prior Publication Data

US 2008/0209098 A1    Aug. 28, 2008

Related U.S. Application Data

(63) Continuation-in-part of application No. 11/470,825, filed on Sep. 7, 2006.

(51) Int. Cl.
*G06F 17/50* (2006.01)

(52) U.S. Cl.
USPC .......................................... 716/100

(58) Field of Classification Search
USPC .............................. 716/1, 15, 100
See application file for complete search history.

(56) References Cited

U.S. PATENT DOCUMENTS

| | | | |
|---|---|---|---|
| 5,712,629 A | 1/1998 | Curtiss, Jr. et al. | |
| 5,790,436 A * | 8/1998 | Chen et al. ................... | 716/136 |
| 6,415,341 B1 | 7/2002 | Fry, Sr. et al. | |
| 6,484,213 B1 | 11/2002 | Nouri | |
| 7,234,971 B2 | 6/2007 | Chou et al. | |
| 7,520,430 B1 * | 4/2009 | Stewart et al. ............... | 235/383 |
| 7,650,519 B1 * | 1/2010 | Hobbs et al. .................. | 713/300 |
| 7,716,135 B2 * | 5/2010 | Angell .......................... | 705/44 |
| 2002/0116217 A1 * | 8/2002 | Yamakawa et al. ........... | 705/1 |
| 2002/0116218 A1 | 8/2002 | Tanaka et al. | |
| 2003/0135418 A1 | 7/2003 | Shekhar et al. | |
| 2004/0135801 A1 | 7/2004 | Thompson et al. | |
| 2005/0080982 A1 | 4/2005 | Vasilevsky et al. | |
| 2005/0147117 A1 | 7/2005 | Pettey et al. | |
| 2005/0182712 A1 * | 8/2005 | Angell ........................... | 705/39 |
| 2005/0190536 A1 * | 9/2005 | Anderson et al. ............ | 361/686 |
| 2005/0242178 A1 * | 11/2005 | Minowa ....................... | 235/383 |
| 2006/0039356 A1 | 2/2006 | Rao et al. | |
| 2006/0064391 A1 | 3/2006 | Petrov et al. | |
| 2006/0065721 A1 | 3/2006 | Addison et al. | |

(Continued)

FOREIGN PATENT DOCUMENTS

| | | |
|---|---|---|
| JP | 2003167647 A | 6/2003 |
| JP | 2004038955 A | 2/2004 |

(Continued)

OTHER PUBLICATIONS

PCI Express Base Specification, Rev. 1.1, Mar. 28, 2005, pp. 27-29, PCI-SIG, Beaverton, OR, United States.

*Primary Examiner* — Suchin Parihar
(74) *Attorney, Agent, or Firm* — Patterson & Sheridan, LLP

(57) ABSTRACT

Exemplary embodiments describe a design structure embodied in a machine readable storage medium for designing, manufacturing, and/or testing a design for performing the functions of a PCI Express feature card remotely from a data processing system. The system is comprised of a circuit board connected to a PCI-E feature card. The PCI-E feature card is remotely located in comparison to the circuit board. Architecturally, the PCI-E feature card appears to the circuit board to be located at the circuit board.

19 Claims, 3 Drawing Sheets

(56) References Cited

U.S. PATENT DOCUMENTS

| | | | |
|---|---|---|---|
| 2007/0156436 A1* | 7/2007 | Fisher et al. | 705/1 |
| 2007/0228163 A1* | 10/2007 | Schon et al. | 235/383 |
| 2008/0065738 A1* | 3/2008 | Landers et al. | 709/217 |
| 2008/0071640 A1* | 3/2008 | Nguyen | 705/26 |
| 2008/0255960 A1* | 10/2008 | Nguyen | 705/27 |

FOREIGN PATENT DOCUMENTS

| | | |
|---|---|---|
| JP | 2005332396 A | 12/2005 |
| JP | 2006107092 A | 4/2006 |
| JP | 2006238270 A | 9/2006 |
| WO | 2006069190 | 6/2006 |

\* cited by examiner

STRUCTURE FOR PCI-E BASED POS TERMINAL

CROSS-REFERENCE TO RELATED APPLICATION

This application is a continuation-in-part of co-pending U.S. patent application Ser. No. 11/470,825, filed Sep. 7, 2006, which is herein incorporated by reference

BACKGROUND OF THE INVENTION

1. Field of the Invention

The present invention relates generally to design structures, and more specifically, design structures for performing the functions of a PCI Express feature card remotely from the point-of-sale system unit.

2. Description of the Related Art

Point-of-sale ("POS") terminals, such as cash registers, are used in a wide variety of retail businesses such as a supermarket, a convenience store, or the like, for performing such processes as calculating the total price of a purchase (goods or services) and calculating the amount of change due to a customer. Some point-of-sale terminals furthermore track purchases made and adjust a database of store inventory accordingly. Some point-of-sale terminals print commodity information about the purchased commodity name and its price on a receipt after adding advertising information such as commodity (or goods) advertisement, an announcement about an event which is scheduled to take place in the future, or the like thereto. Recently, there are also cases where, aside from the advertising information, information such as a coupon ticket or a lottery ticket is added to the print out. Thus, in many cases, each point-of-sale terminal must be a complete data processing system in order to perform all the functions required.

Many businesses use one form of point-of-sale input/output (I/O) device or another to assist in the purchase or sale of an item or to complete a sales transaction. There are many different communication interfaces used by the point-of-sale I/O devices. The many different interfaces require point-of-sale system units to be designed with one or two specific I/O communication interfaces, or a complex changeable connector implementation. Supporting these I/O communication interfaces results in large point-of-sale system units.

BRIEF SUMMARY OF THE INVENTION

Exemplary embodiments describe a system and a method for performing the functions of a PCI-E feature card remotely from a data processing system. The system is comprised of a circuit board connected to a PCI-E feature card. The PCI-E feature card is remotely located in comparison to the circuit board. Architecturally, the PCI-E feature card appears to the circuit board to be located at the circuit board.

In one embodiment, a design structure embodied in a machine readable storage medium for at least one of designing, manufacturing, and testing a design is provided. The design structure generally includes a data processing system for performing the functions of a PCI Express feature card remotely from the data processing system. The data processing system generally includes a circuit board, and a PCI Express feature card remotely located in comparison to the circuit board and appearing architecturally to the circuit board to be located at the circuit board.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
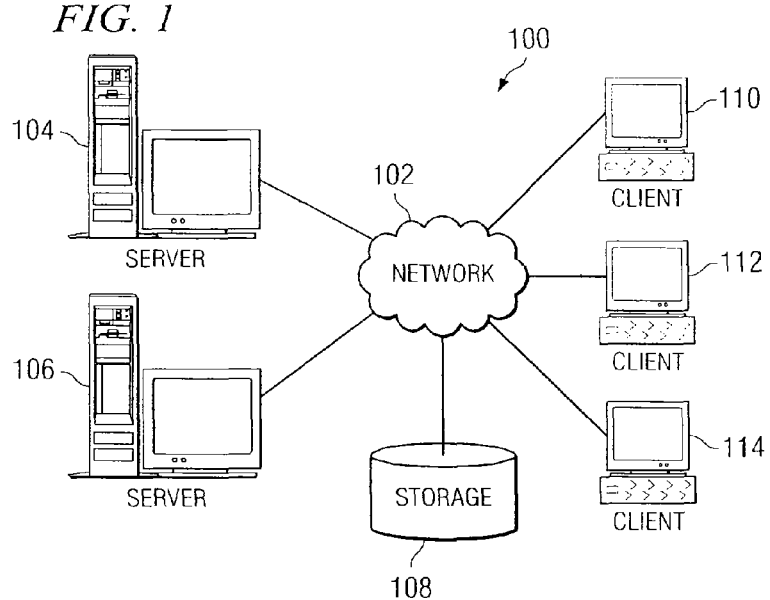
FIG. 1 is a pictorial representation of a network of data processing systems in which exemplary aspects may be implemented.
Figure 2:
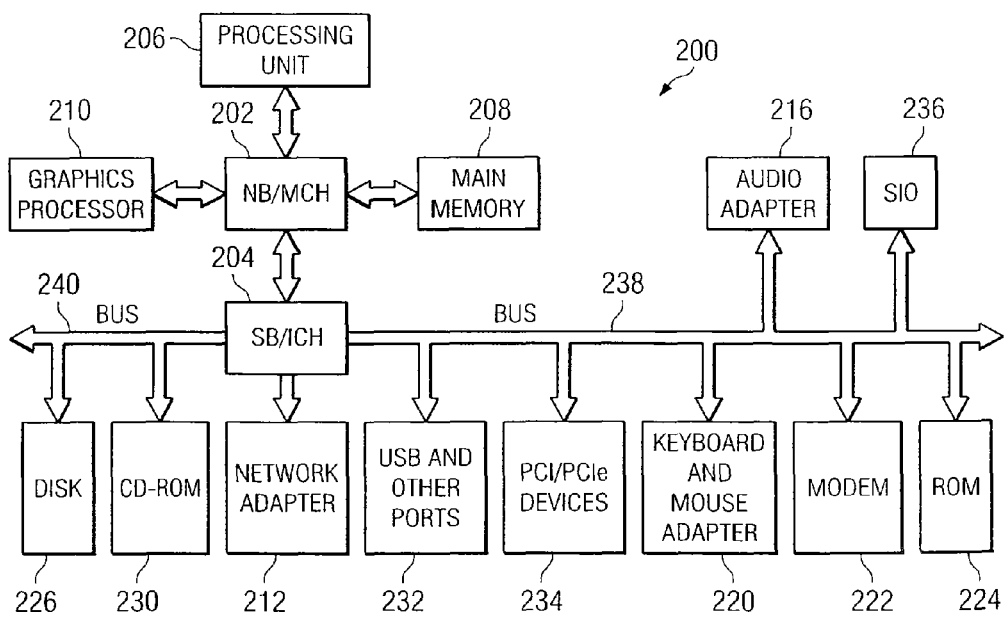
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCI-E devices 234 connect to south bridge and I/O controller hub 204 through bus 238 and bus 240. PCI/PCI-E devices may include, for example, Ethernet adapters, add-in cards and PC cards for notebook computers. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ xSeries® Bladecenter computer system, running Windows or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

PCI Express (PCI-E) is a follow-on PC adapter card expansion interface. The PCI-E interface utilizes what are termed "lanes". A lane is a serial signal channel. A PCI-E interface can be x1, x2, x4, x16 or x32(servers only) lanes wide. A x1 PCI-E lane provides roughly 2× to 4× the data bandwidth of a standard PCI interface, or slot. A standard PCI slot uses a parallel bus that can be either 32 or 64 data bits wide, that uses multiple drivers and receivers to transfer all the bits in parallel (simultaneously). This interface is implemented using 1 physical wire for each data bit plus a separate set of signals/wires for bus control. The separate set comprises approximately twenty (20) signals/wires. A standard exists for the interface. Information on the standard may be found at www-.pcisig.org.

In a typical PCI data transfer either four (4) bytes, if thirty-two (32) bits of data wide or eight (8) bytes, if sixty-four (64) bits of data wide, are transferred during each cycle. PCI-E is a serial transfer. Data that is being transferred is transferred as a "packet" of data, using a defined protocol, much like a LAN or other serial communications medium. Each lane of a PCI-E interface is composed of two data channels, one from the host to the device and one from the device to the host. All data transfer and control/synchronization on a per lane basis is accomplished using these two data channels. Each data channel is implemented using a differential, or two (2) wire interface, where a 1 or a 0 is determined based on the polarity of the voltage between the two wires. In a PCI-E data transaction, data is transferred from/to the host by PCI-E controllers at each end of the lane using the native architecture of the device and the controllers themselves convert this information into packets and transfer the data with no further involvement of the system.

Each lane is implemented with four (4) wires, the four wires comprise two transmit and receive pairs. Previous demonstrations have proven that a x1 PCI lane can be run over 100M CAT 6 Ethernet cable. CAT stands for category. Wiring categories are defined by the Electronic Industries Association, a trade group, also called EIA. A specific category of wiring is an EIA specification that defines specific technical characteristics, such as capacitance, crosstalk, impedance, and so forth of the wire. For instance, $^{10}/_{100}$ Ethernet requires category (CAT) 5 cable while Gigabit Ethernet requires category (CAT) 6 cable. Category (CAT) 6 and category (CAT)

5 cable are both referred to generically as unshielded twisted pair cable. Prior to the development of PCI-E, it would not have been possible or practical to remotely locate a PCI feature card, because remotely locating the PCI feature card would require many wires to implement, approximately 90 or more wires to transfer information from one place to the other across a sixty-four (64) bit PCI interface. To one of ordinary skill in the art, it would be obvious that other types of connections may be used to drive PCI-E connections besides CAT 6 cable, such as a wireless connection or fiber optic cable, for example.

In an exemplary embodiment, utilization of PCI-E enables a data processing system, such as a point-of-sale system unit to be independent from the point-of-sale I/O devices and the communication interface requirements of the point-of-sale I/O device. The data processing hardware of the point-of-sale system unit may now be located in a server that is remote from the point-of-sale I/O devices, yet the data processing hardware architecturally appears to be local to the point-of-sale I/O devices.

Typically, the I/O communications interface to point-of-sale I/O devices is included in a PCI adapter. The PCI adapter could be a dedicated feature card or physically located on the point-of-sale system unit motherboard. An exemplary embodiment provides for a PCI-E feature card that is at a location that is remote to the dedicated connection socket yet performs architecturally as if the PCI-E feature card were directly connected to the motherboard.

Figure 3:
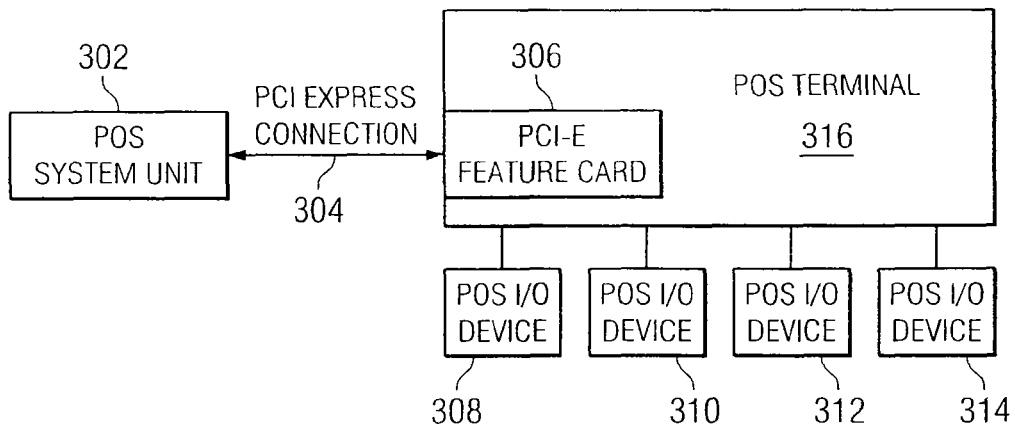
FIG. 3 is a block diagram of components for implementing a PCI-E based point-of-sale terminal in accordance with an exemplary embodiment.

FIG. 3 is a block diagram of components for implementing a PCI-E based point-of-sale terminal in accordance with an exemplary embodiment. PCI-E feature card 306 is connected to point-of-sale system unit 302 via PCI-E connection 304. Point-of-sale system unit 302 may be implemented as a data processing system, such as data processing system 200 in FIG. 2. Point-of-sale system unit 302 is PCI-E enabled. A data processing system is PCI-E enabled if the data processing system supports PCI-E. Enabling a data processing system for PCI-E is a function of the hardware chips that are selected as part of the design of the data processing system. Typically this function is found in the "northbridge/southbridge" chipset of a motherboard. A motherboard is the main circuit board of a microcomputer. PCI-E feature card 306 is part of point-of-sale terminal 316. Point-of-sale I/O devices 308, 310, 312, and 314 are connected to point-of-sale terminal 316. Point-of-sale I/O devices 308, 310, 312, and 314 represent any type of point-of-sale I/O device, such as a keyboard, display unit, bar code scanner, and so forth using any type of I/O interface, such as USB, RS232, and so forth. Point-of-sale I/O devices 308, 310, 312, and 314 are run off of one point-of-sale terminal where PCI-E feature card 306 is located. As the PCI-E feature card has been removed from the point-of-sale system unit, multiple PCI-E connections can now be connected to a point-of-sale system unit. Thus, in one implementation, multiple check-out aisles in a store could be connected to only one point-of-sale system unit, or a central server, allowing all the point-of-sale functions to be centrally controlled and managed. Therefore, each actual point-of-sale terminal would only need a PCI-E feature card and connections for the point-of-sale I/O devices instead of each point-of-sale terminal being a data processing system itself.

Figure 4:
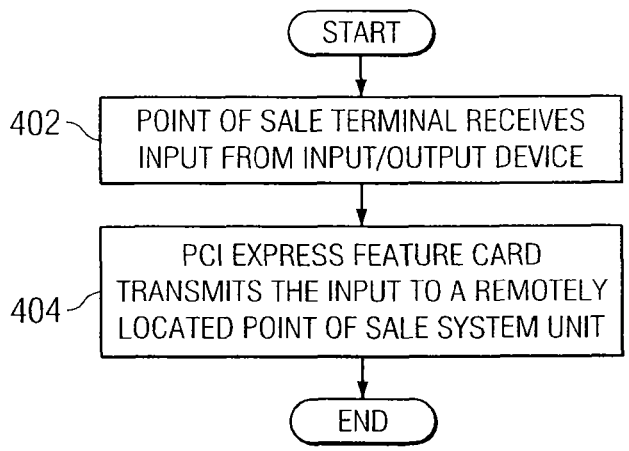
FIG. 4 is a flowchart illustrating the operation of receiving input in a PCI-E based point-of-sale terminal in accordance with an exemplary embodiment.

FIG. 4 is a flowchart illustrating the operation of receiving input in a PCI-E based point-of-sale terminal in accordance with an exemplary embodiment. The operation of FIG. 4 may be performed by a PCI-E feature card such as PCI-E feature card 306 in FIG. 3. The operation begins when a point-of-sale terminal receives input from input/output device, such as a scanner (step 402). The input is received by the PCI-E feature card. The PCI-E feature card transmits the input down a lane to a remotely located point-of-sale system unit, which may be implemented as a remote data processing system, such as data processing system 200 in FIG. 2 (step 404), and the operation ends. The PCI-E feature card is connected to the remote point of sale system unit by a PCI-E connection, which comprises cable that at least satisfies the criteria for a category 6 wire.

Figure 5:
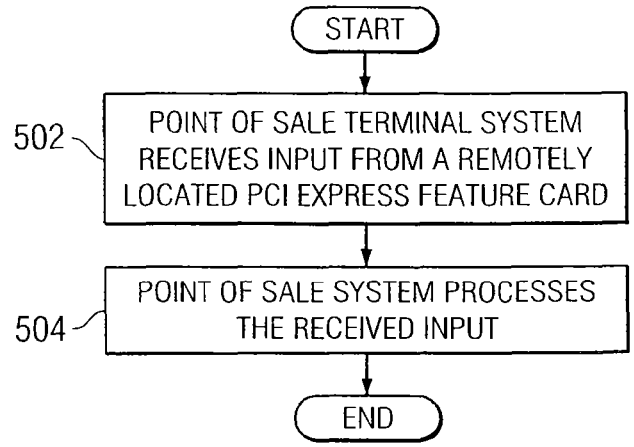
FIG. 5 is a flowchart illustrating the operation of receiving input from a PCI-E feature card in accordance with an exemplary embodiment.

FIG. 5 is a flowchart illustrating the operation of receiving input from a PCI-E feature card in accordance with an exemplary embodiment. The operation of FIG. 5 may be performed by a point-of-sale system unit, such as point-of-sale system unit 302 in FIG. 3. The operation begins when a point-of-sale terminal system receives input from a remotely located PCI-E feature card (step 502). The remotely located PCI feature card is connected to the point of sale system unit by a PCI-E connection, which comprises cable that at least satisfies the criteria for a category 6 wire. The input is received by the motherboard of the point-of-sale system. The point-of-sale system processes the received input (step 504), and the operation ends.

Figure 6:
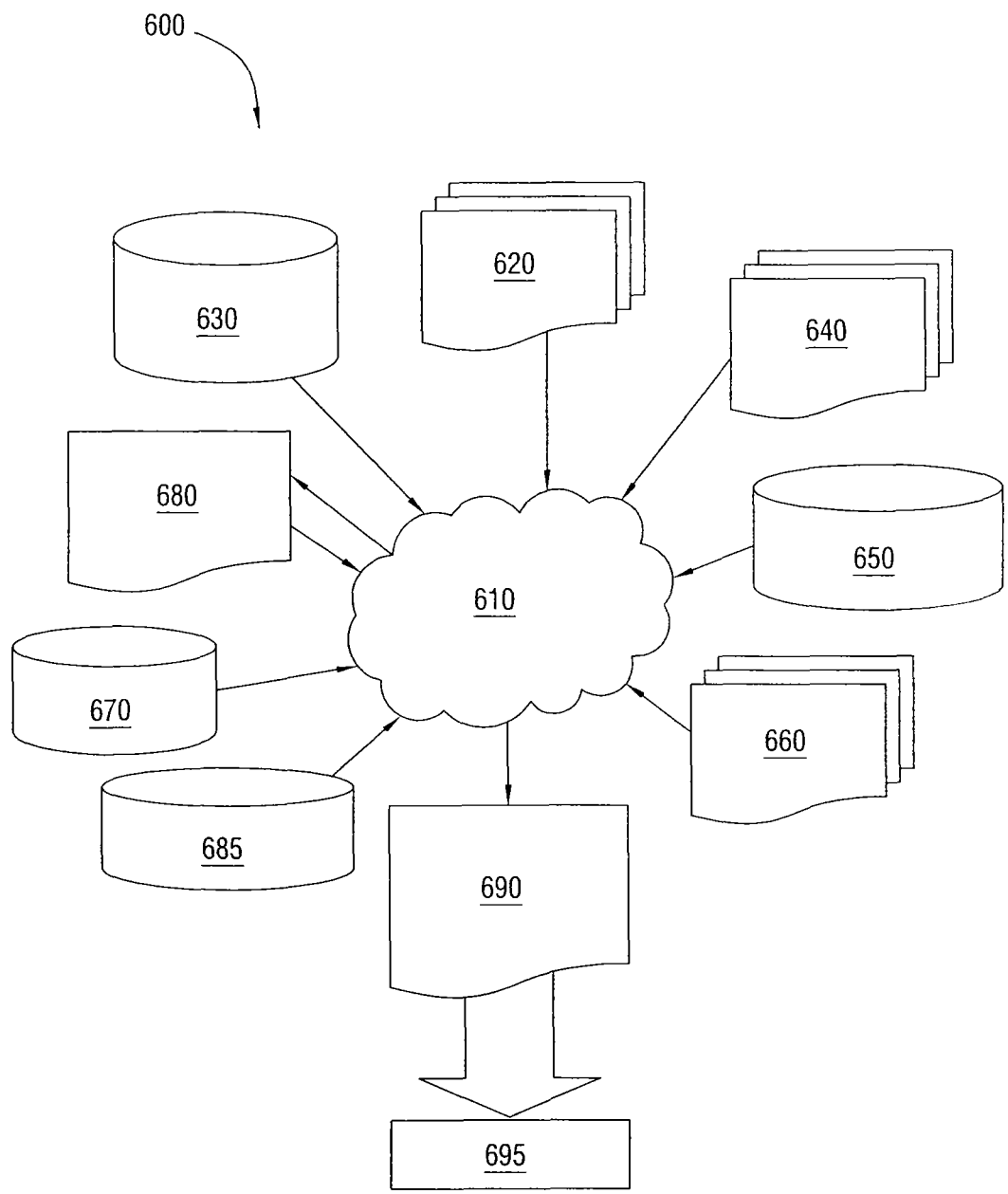
FIG. 6 is a flow diagram of a design process used in semiconductor design, manufacture, and/or test.

FIG. 6 shows a block diagram of an exemplary design flow 600 used for example, in semiconductor design, manufacturing, and/or test. Design flow 600 may vary depending on the type of IC being designed. For example, a design flow 600 for building an application specific IC (ASIC) may differ from a design flow 600 for designing a standard component. Design structure 620 is preferably an input to a design process 610 and may come from an IP provider, a core developer, or other design company or may be generated by the operator of the design flow, or from other sources. Design structure 620 comprises the circuits described above and shown in FIGS. 1-3 in the form of schematics or HDL, a hardware-description language (e.g., Verilog, VHDL, C, etc.). Design structure 620 may be contained on one or more machine readable medium. For example, design structure 620 may be a text file or a graphical representation of a circuit as described above and shown in FIGS. 1-3. Design process 610 preferably synthesizes (or translates) the circuit described above and shown in FIGS. 1-3 into a netlist 680, where netlist 680 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 680 is resynthesized one or more times depending on design specifications and parameters for the circuit.

Design process 610 may include using a variety of inputs; for example, inputs from library elements 630 which may house a set of commonly used elements, circuits, and devices, including models, layouts, and symbolic representations, for a given manufacturing technology (e.g., different technology nodes, 32 nm, 45 nm, 90 nm, etc.), design specifications 640, characterization data 650, verification data 660, design rules 670, and test data files 685 (which may include test patterns and other testing information). Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates a circuit as described above and shown in FIGS. 1-3, along with any additional integrated circuit design or data (if applicable), into a second design structure 690. Design structure 690 resides on a storage medium in a data format used for the exchange of layout data of integrated circuits (e.g. information stored in a GDSII (GDS2), GL1, OASIS, or any other suitable format for storing such design structures). Design structure 690 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1-3. Design structure 690 may then proceed to a stage 695 where, for example, design structure 690: proceeds to tape-out, is released to manufacturing, is released to a mask house, is sent to another design house, is sent back to the customer, etc.

The invention can take the form of an entirely hardware embodiment or an embodiment containing both hardware and software elements.

For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A non-transitory machine readable storage medium including design data for at least one of designing, manufacturing, and testing a design, wherein, when executed by a processor, the design data implements the design comprising a point-of-sale system unit, wherein the point-of-sale system unit functions as a central server, and wherein the point-of-sale system unit comprises:
    a circuit board; and
    a PCI Express interface communicatively coupled to the circuit board and configured to couple, via a PCI Express communication channel, to a PCI Express feature card, wherein the PCI Express feature card is located in a point-of-sale terminal remote from the point-of-sale system unit, and wherein the PCI Express feature card appears architecturally to the circuit board to be located at the circuit board,
    wherein one or more point-of-sale input/output devices physically coupled to the point-of-sale terminal use the PCI Express feature card to provide input data to the point-of-sale system unit.

2. The non-transitory machine readable storage medium of claim 1, wherein the PCI Express communication channel is a bus connecting the PCI Express interface and the PCI Express feature card.

3. The non-transitory machine readable storage medium of claim 2, wherein the bus is a cable.

4. The non-transitory machine readable storage medium of claim 3, wherein the cable comprises an unshielded twisted pair cable.

5. The non-transitory machine readable storage medium of claim 1, wherein the PCI Express communication channel is a wireless connection.

6. The non-transitory machine readable storage medium of claim 3, wherein the cable comprises a fiber optic cable.

7. The non-transitory machine readable storage medium of claim 1, wherein the circuit board is a motherboard.

8. The non-transitory machine readable storage medium of claim 1, further comprising a netlist that describes the point-of-sale system unit.

9. The non-transitory machine readable storage medium of claim 1, wherein the design structure resides on the non-transitory machine readable storage medium as a data format used for an exchange of layout data of integrated circuits.

10. A non-transitory machine readable storage medium including design data for at least one of designing, manufacturing, and testing a design, wherein when executed by a processor, the design data implements the design comprising a point-of-sale system unit and a PCI Express connection, wherein the point-of-sale system unit functions as a central server, and wherein the point-of-sale system unit comprises:
    a circuit board; and
    a PCI Express interface communicatively coupled to the circuit board and configured to couple, via a PCI Express connection, to a PCI Express feature card located remotely from the point-of-sale system unit and wherein the PCI Express feature card appears architecturally to the circuit board to be located at the circuit board,
    wherein the PCI Express connection comprises one of an unshielded twisted pair cable, a fiber optic cable, and a wireless connection.

11. The non-transitory machine readable storage medium of claim 10, wherein the PCI Express interface is a PCI Express connector.

12. The non-transitory machine readable storage medium of claim 10, wherein the circuit board is a motherboard.

13. The non-transitory machine readable storage medium of claim 10, wherein the PCI Express feature card is located in a point-of-sale terminal.

14. A non-transitory machine readable storage medium embodying a design structure for at least one of designing, manufacturing, and testing a design, wherein when executed by a processor, the design structure implements the design comprising a point-of-sale system unit and a separate point-of-sale terminal, wherein the point-of-sale system unit functions as a central server, and wherein the point-of-sale system unit comprises:

a circuit board; and a PCI Express interface communicatively coupled to the circuit board and configured to couple to a PCI Express feature card located in the point-of-sale terminal, wherein the PCI Express feature card is connected to the circuit board via a bus and the PCI Express interface, and wherein the PCI express feature card appears architecturally to the circuit board to be located at the circuit board, wherein one or more point-of-sale input/output devices physically coupled to the point-of-sale terminal use the PCI Express feature card to provide input data to the point-of-sale system unit.

15. The design structure of claim 14, wherein the circuit board is a motherboard.

16. The design structure of claim 14, wherein the PCI Express connection comprises one of an unshielded twisted pair cable, a fiber optic cable, and a wireless connection.

17. The non-transitory machine readable storage medium of claim 1, wherein one or more point-of-sale input/output devices physically coupled to the point-of-sale terminal use the PCI Express feature card to provide input data to the point-of-sale system unit.

18. The non-transitory machine readable storage medium of claim 10, wherein one or more point-of-sale input/output devices physically coupled to the point-of-sale terminal use the PCI Express feature card to provide input data to the point-of-sale system unit.

19. The non-transitory machine readable storage medium of claim 10, wherein the circuit board of the point-of-sale system unit is communicatively coupled, via a plurality of PCI Express connections, to a plurality of PCI Express feature cards, wherein each of the plurality of PCI Express feature cards is located in a respective one of a plurality of remote point-of-sale terminals.

* * * * *